United States Patent [19]

Hein et al.

[11] 3,987,630
[45] Oct. 26, 1976

[54] MECHANICAL THERMAL MOTOR

[75] Inventors: Leopold A. Hein, Fayetteville, Tenn.; William N. Myers, Huntsville, Ala.

[73] Assignee: The United States of America as represented by the Administrator of the National Aeronautics and Space Administration, Washington, D.C.

[22] Filed: June 30, 1975

[21] Appl. No.: 591,569

[52] U.S. Cl. ................................................. 60/527
[51] Int. Cl.² .......................................... F03G 7/06
[58] Field of Search ........................... 60/527–529; 73/363.7, 363.9, 363; 236/101

[56] References Cited
UNITED STATES PATENTS

| 792,588 | 6/1905 | Fulton | 60/527 UX |
|---|---|---|---|
| 2,091,255 | 8/1937 | Coleman et al. | 60/529 X |
| 3,430,441 | 3/1969 | Adams | 60/529 |
| 3,678,685 | 7/1972 | Low et al. | 60/529 |
| 3,720,107 | 3/1973 | Shepard | 60/529 X |

Primary Examiner—Allen M. Ostrager
Attorney, Agent, or Firm—L. D. Wofford, Jr.; Gary F. Grafel; John R. Manning

[57] ABSTRACT

An apparatus is provided for converting thermal energy such as solar energy into mechanical motion for driving fluid pumps and the like. The thermal motor comprises an inner concentric cylinder carried by a stationary core member having a cylindrical disc plate fixed adjacent a lower portion thereof and extending radially therefrom, and an outer concentric cylinder rotatably carried on the disc plate defining a space between the inner and outer concentric cylinders. A spiral tubular member encircle the inner concentric cylinder and is contained within the space between said inner and outer cylinders having a first portion connected to the inner concentric cylinder and a second portion connected to the outer concentric cylinder. A heated fluid is conveyed through the tubular member and is periodically cooled causing the tubular member to expand and contract, thus causing the outer concentric cylinder to reciprocally rotate on the base plate accordingly. The reciprocating motion of the outer concentric cylinder is then utilized to drive a pump member in a pump chamber.

7 Claims, 7 Drawing Figures

MECHANICAL THERMAL MOTOR

Origin of the Invention

The invention described herein was made by employees of the United States Government and may be manufactured and used by or for the Government for governmental purposes without the payment of any royalties thereon or therefor.

BACKGROUND OF THE INVENTION

The present invention relates to a thermal motor for converting thermal energy, such as solar energy, into mechanical motion. Heretofore, devices have been developed for converting thermal energy into mechanical energy, such as shown in U.S. Pat. No. 3,070,953 wherein a bi-metallic coiled spring member is subjected to hot and cold fluids alternately to expand and contract the spring member deriving reciprocating mechanical rotary motion therefrom. In U.S. Pat. No. 3,772,876 a reciprocating thermal motor is disclosed which also uses a bi-metallic spring element subjected to alternate hot and cold cycles with the source of heat being solar energy. However, much of the heat from the heated fluid is lost in such devices through contact with other parts of the motor other than the element which is to be heated. It can also be seen that such devices are fairly complicated, particularly the apparatus shown in U.S. Pat. No. 3,070,953.

Summary of the Invention

The invention includes a thermal motor for converting heat energy, such as solar energy, into mechanical motion. The thermal motor includes an inner core member supported on a base structure having a solid cylindrical disc plate adjacent a lower end thereof extending radially out from the core member, an inner concentric cylinder carried by the inner core member, and an outer concentric cylinder rotatably carried on the disc plate defining a space between the inner and outer concentric cylinders. A spiral tubular member encircles the inner concentric cylinder and is contained within the space between the inner and outer cylinders. The spiral tubular member has a first end portion connected to the inner concentric cylinder and a second end portion connected to the outer concentric cylinder. A heated fluid is conveyed through the tubular member and a cooling means is provided for periodically cooling the tubular member whereby the spiral tubular member expands and contracts according to the heating and cooling thereof causing the outer concentric cylinder to reciprocally rotate freely on the disc plate accordingly. In a particular embodiment it is also possible to utilize both a heated fluid and solar energy coming directly from the sun to heat the tubular member.

Accordingly, it is an important object of the present invention to provide a thermal motor for converting thermal energy into mechanical motion.

Still another important object of the present invention is to provide a thermal motor which requires little external energy to convert the thermal energy into mechanical energy.

Still another important object of the present invention is to provide a system which incorporates a thermal motor for converting the thermal energy in a heated fluid and solar energy from the sun directly into mechanical motion.

Still another important object of the present invention is to provide a thermal motor which limits the contact of the heated fluid to the heated element itself preventing loss of thermal energy in the motor.

These and other objects and advantages of the invention will become apparent upon reference to the following specification, attendant claims, and drawings.

DESCRIPTION OF A PREFERRED EMBODIMENT

This invention relates to a thermal motor which utilizes a heated fluid which may be heated by a conventional solar heating device or other suitable heating source, or may utilize solar energy rays coming directly from the sun to heat the heating element of the motor. It is also possible to use both a heated fluid and the direct solar energy from the sun during the heat cycle to heat the heating element.

Figure 1:
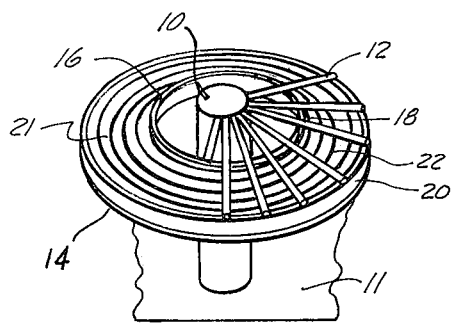
FIG. 1 is a perspective view of a thermal motor constructed in accordance with the present invention.

Referring in more detail to FIG. 1 of the drawing, there is illustrated a perspective view of the thermal energy motor adapted to convert the thermal energy, such as solar energy into mechanical motion. The apparatus includes an inner core member 10 which may be supported on a suitable base structure 11 and may be constructed of any suitable material such as wood. The inner core member is in the form of a solid cylinder and has a plurality of circumferentially spaced spoke members 12 extending outwardly from the top thereof. A solid cylindrical disc-shaped plate 14 is carried adjacent a lower portion of the inner core member and extends radially therefrom, the inner edge of the disc plate 14 being attached to the core member in any suitable manner. An inner concentric cylinder 16 constructed of any suitable material such as metal, encircles the core member 10 and has a diameter greater than that of the inner core member. The spoke members 12 have their inner ends attached to the core member 10 by any suitable means such as by welding, and are also attached as by welding at 18 to the inner concentric cylinder 16.

An outer concentric cylinder 20 also encircles the inner core member 10 and the inner concentric cylinder 16 and has a diameter greater than that of the inner concentric cylinder 16. A space 21 is defined between the inner and outer concentric cylinders 16 and 20. The outer concentric cylinder 20 is supported for rotation on the cylindrical disc plate 14 and may rotate freely thereon in a manner to be more fully described later. The specific dimensions of the cylinder 16 and 20 depend on the desired amount of expansion or movement that is to be produced by the thermal motor. This, of course, is dictated by the particular type motor being utilized and the materials used therein. The spoke members 12 extend slightly past the outer cylinders 20 to contain the cylinder on the disc plate 14.

Figure 2:
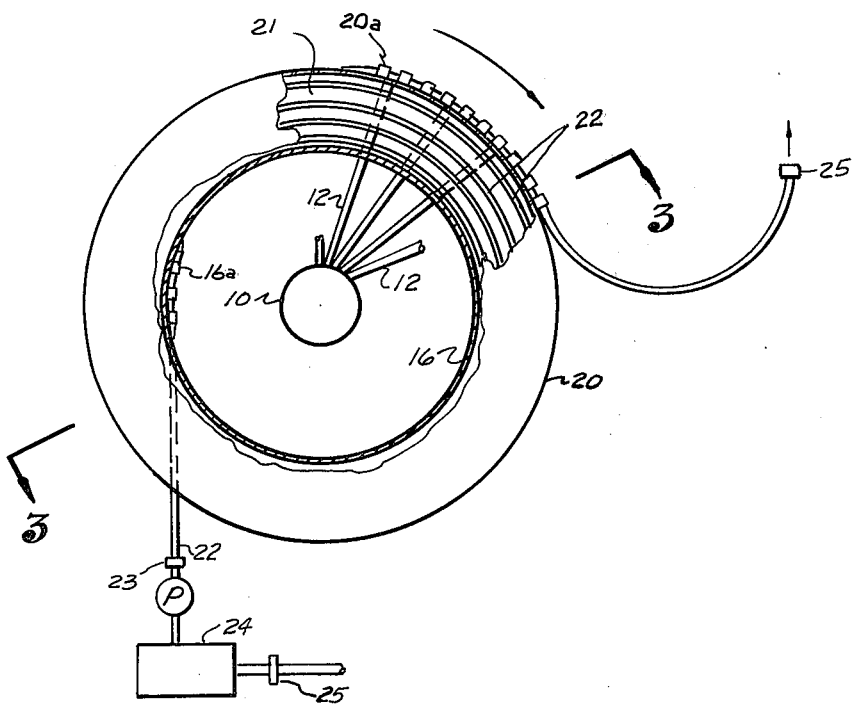
FIG. 2 is an enlarged bottom plan view of the thermal motor shown in FIG. 1.

A heat element is provided by a spiral tubular member 22, which is best seen in FIG. 2, which encircles the inner concentric cylinder and is received and contained in the space 21 between the inner and outer concentric cylinders 16 and 20. The spiral tubular member 22 has an inner end portion attached to the inner concentric cylinder 16 by any suitable means such as clamps 16a or welding. it is wrapped around the inner concentric cylinder in a spiral manner and an outer end portion thereof is attached to the outer cylinder 20 by any suitable means such as welding or clamps 20a. The tubular member 22 has an inlet coupling 23 on one end thereof which can be coupled to any suitable source of heated fluid 24. In one embodiment, the tubular spiral configuration is as follows: tube outside diameter 0.5 inches, spiral length 492 feet, and spiral diameter 4 feet. The tubular member may be constructed of a suitable metal such as aluminum, steel, copper, and the like.

A conventional pump P may be utilized to supply and convey the heated fluid such as hot water, through the tubular member or the fluid may be supplied by using a gravity feed system. The source of fluid 24 may be heated in any conventional manner and most preferably is heated by a conventional solar energy heating device. A similar outlet coupling 25 is provided on an outlet end of the tubular member 22 for connection to the heated fluid source 24. Thus, the heated fluid may be utilized in a closed system wherein the heated fluid is continuously conveyed through the heated source 24. The tubular member 22 is preferably coated with teflon or other suitable low friction coating so that as it expands and contracts the friction between the spiral layers is reduced. The efficiency of the thermal motor is enhanced by conveying the heated fluid through the heating element in the form of the tubular member 22 whereby contact of the heated fluid with other parts of the thermal motor is avoided and loss of thermal energy is reduced.

The thermal energy motor will be first described in operation only with a heated fluid and not in conjunction with direct solar energy. As the heated fluid is conveyed through the tubuatr member 22 the tubular member expands causing outer cylinder 20 to rotate clockwise on disc 14. During a cooling cycle, at the end of the heat cycle, a cooling fluid such as cold water is sprayed onto the spiral tubular member 22 causing the tubular member to contract and thus causing the outer concentric cylinder 20 to rotate counter-clockwise. The reciprocating motion of cylinder 20 can thus be used to drive a pump and the like as will be more full described herein. It is noted that the spoke members 12 while extending over the top of the tubular member 22 to contain the tubular member in the space 21, are not attached to the spiral tubular member nor are they attached to the outer concentric cylinder 20 so as to permit such to move freely relative thereto. The primary purpose of the radially extending members 12 is to contain the tubular member 22 between the inner cylinder 16 and the outer cylinder 20 and the lower disc plate 14 while permitting the cooling fluid to pass freely therebetween to contact the tubular member 22.

Figure 5:
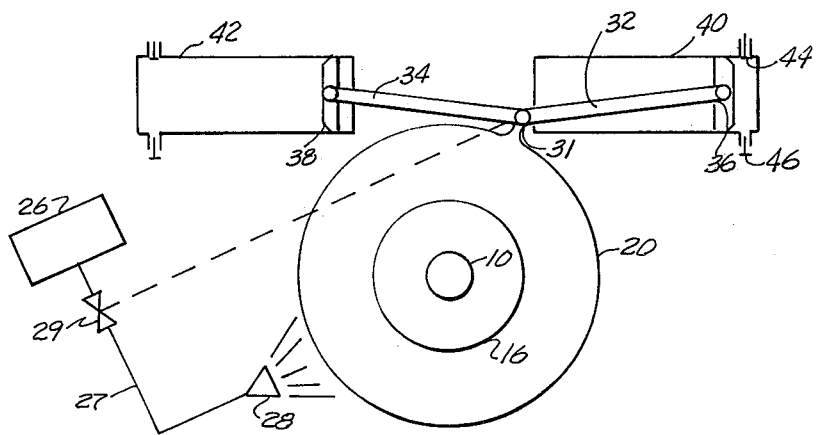
FIG. 5 is a schematic diagram of a thermal motor constructed in accordance with the present invention showing the operation of the thermal motor in driving a pair of piston pumps.
Figures 6, 7:
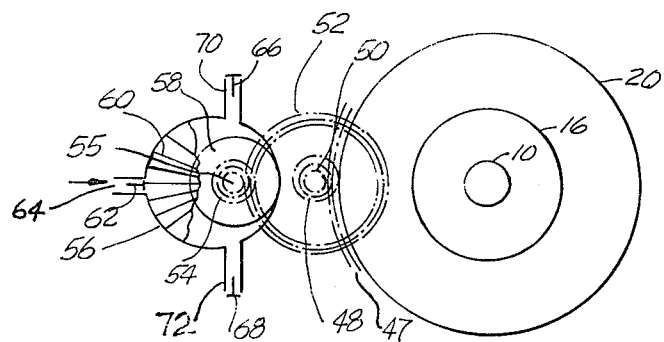
FIG. 6 is a schematic diagram illustrating a thermal motor constructed in accordance with the present invention for operating a rotary pump member.
FIG. 7 is an alternate embodiment of a thermal motor constructed in accordance with the present invention.

The thermal cycling of fluid through the tubular member 22 includes alternately heating and cooling the spiral tubular member 22. The heat/expansion cycle and the cooling/contraction cycle of the tubular members provide motion for input to a piston or rotary pump, such as shown in FIGS. 5 and 6. The hot water may be heated by conventional solar panels and the cold water is supplied from any conventional source illustrated schematically as 26. A supply line 27 delivers the cooling fluid to a sprayhead 28 for spraying the fluid over the tubular member 22. A conventional control valve 29 may be inserted in the supply line 27 and operatively connected to the outer concentric cylinder 20 to provide periodic cycling of the cooling fluid at the end of each heat cycle.

When it is desired to use direct solar energy in conjunction with a heated fluid, which of course can also be heated by the solar energy, the thermal motor is positioned directly in the path of the sun's rays. In addition, the sun's rays can be directed toward the thermal motor by any suitable means such as a conventional optical/mirror system. It is also to be understood that the rays from the sun may be concentrated by arranging mirrors prior to directing the rays to the tubular member 22 of the thermal motor. The solar energy rays striking the tubular member heat the fluid passing therethrough causing the tubular member to expand in the same manner as when the heated fluid passes therethrough. The cooling fluid is sprayed over the tubular members 22 in a cyclic manner as described above. Therefore, the device shown in FIGS. 1 through 5 produces a reciprocating mechanical motion of the outer concentric cylinder 20 responsive to the tubular member 22 being alternately heated and cooled.

Figure 3:
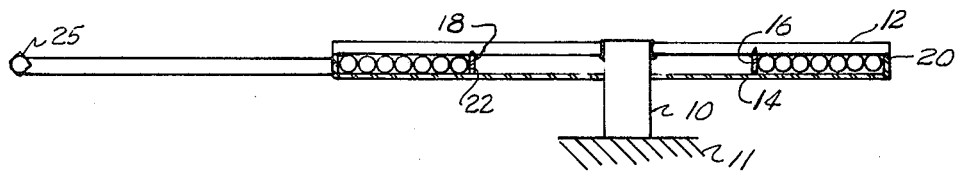
FIG. 3 is a sectional view taken along the line 3—3 of FIG. 2.

FIG. 3 is a sectional view taken along line 3—3 of FIG. 2 showing the spiral tubular member 22 positioned between the disc plate 14 and the spoke members 12, and between the inner and outer concentric cylinders 16 and 20, respectively.

Figure 4:
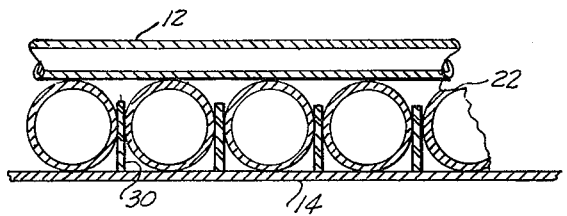
FIG. 4 is a cut-away, sectional view of the spiral tubular member shown in FIG. 3, illustrating an alternate embodiment of the spiral tubular assembly.

FIG. 4 illustrates an alternate form of the disc plate 14 wherein a vertically extending spiral spacer member 30 is affixed to the cylindrical disc plate 14 for receiving and containing the spiral tubular member 22 so as to reduce the friction between adjacent portions or layers of the tubular member as it expands and contracts. The vertical spacer member 30 aids in restraining the tubular member 22 within the thermal motor and is coated with teflon or other suitable coating to reduce the friction between adjacent layers of the tubular member.

FIG. 5 is a schematic view of the thermal motor constructed in accordance with the present invention as used to drive a pair of piston pumps. The outer concentric cylinder is connected by means of a linkage arm 31 to a free end of a pair of piston rods 32 and 34. The piston rods 32 and 34 are, in turn, pivotally connected to pistons 36 and 38, respectively, which are slideably received in pump housings defined by cylinders 40 and 42. The pump cylinder 40 is provided with a inlet valve 44 and outlet valve 46 which permit fluid to enter and be discharged therefrom according to the stroke of the piston 36. The pump cylinder 42 is similarly provided with inlet and outlet valves. The valves 44 and 46 may be conventional spring-loaded check valves or reed valves. When the coil 22 is cooled at the end of a heat cycle by spraying cold water thereon, the concentric cylinder 20 is rotated in a counter-clockwise direction moving the piston rod 32 to the left. As the piston rod 32 is moved to the left, the inlet valve 44 is opened by the vacuum created within the cylinder drawing the fluid into the housing of the cylinder. As the tubular member 22 again goes through the heat cycle, the outer concentric cylinder 20 is rotated in a clockwise direction moving the piston rod 32 to the right pressurizing the fluid therein sufficiently to open the outlet valve 46 pumping the fluid out of the pump cylinder. This cyclic operation is repeated pumping fluid in and out of the cylinder 40. A similar operation occurs in the pump 42 except that the pump cycle is 180° out of phase with that of the cylinder 40.

FIG. 6 schematically illustrates a thermal motor constructed in accordance with the present invention for operating an alternate embodiment of a pump. The outer concentric cylinder 20 has gear teeth 47 provided on its periphery which mesh with a gear 48. A gear drive assembly is provided by the gear 48 which is fixed to a shaft 50, and an enlarged gear 52 also fixed to shaft 50. Therefore, as the gear 48 is rotated by the gear teeth 47 in a reciprocating manner, the large gear 52 is also rotated. The large gear 52 in turn meshes with another small gear 54 which is provided on a central input shaft 55 of a vane type rotary pump 56 or any other suitable type of rotary pump may be used. The rotary pump 56 includes a rotary member 58 which has vanes 60 provided thereon. As the gear 54 is reciprocally rotated by the gear teeth 47 through the gear drive assembly it causes the rotary member to rotate accordingly. The rotary pump has an inlet valve 62 provided in an inlet port 64 for delivering fluid thereto. Outlet valves 66 and 68 are provided in outlet ports 70 and 72, respectively.

When the outer concentric cylinder 20 is rotated in a clockwise and counter-clockwise direction responsive to the alternate heating and cooling of the tubular member 22, the vane pump is rotated in a clockwise and counter-clockwise direction, accordingly. When the vane pump is rotated in the clockwise direction the outlet valve 66 will open permitting the fluid entering the inlet port 64 to be pumped therethrough and the outlet valve 68 will be closed due to a slight vacuum existing on that side of the pump chamber. When the rotary member 58 is rotated in the counter-clockwise direction the valve 66 will be closed and the outlet valve 68 will be open pumping the fluid out of the outlet port 72. The outlet valves 66 and 68 and inlet valve 62 may be any suitable valve, such as the spring-loaded check valve type.

FIG. 7 illustrates a modified form of the invention wherein the tubular member 22 takes the form of a plurality of vertically extending tubes 78 constructed in the form of a radiator. The tubes 78 are filled with any suitable fluid, such as mercury or oil, that readily absorbs thermal energy. Positioned at the lower part of the radiator is an outlet chamber 80 having a piston assembly 82 slideably received therein. The piston assembly includes a piston 84 and a piston rod 86. The fluid contained in the tubes 78 is heated during a heat cycle either by directing solar energy rays onto the tubes 78 or in any other suitable manner such as passing a heated fluid in contact with the tubes transferring thermal energy to the fluids contained within the tube 78. The tubes 78 are cooled during a cooling cycle by a cooling fluid sprayed from a sprayhead 87. The cooling fluid is supplied from a cooled fluid source 88 which may be, for example, a source of cold water. The cooling fluid is conveyed through a supply line 89 to the sprayhead 87 and a suitable control valve 90 is connected in the supply line 89 to control the cyclic spraying of the cooling fluid over the tubes 78. The control valve 90 may be connected to a reciprocating shaft 92 to control the cyclic operation of the control valve for spraying the cooling fluid during the cooling cycle.

Connected adjacent the outer end of the piston rod 86 is a lever arm 94 which is pivoted at a pivot point 95. The other end of the lever arm 94 is connected to an arcuate-shaped gear rack 96. The gear rack 96 is provided with gear teeth which mesh with the piston gear 97 fixed to an input shaft 98 of a rotary pump 100. As the fluid within the radiator is heated, it expands forcing the fluid through the outlet chamber 80 moving the piston 84 to the left. As the fluid within the radiator 78 is cooled, the piston 84 is allowed to move to the right. Thus, as the fluid within the radiator is alternately heated and cooled the gear rack 96 reciprocates back and forth rotating the shaft 98 of the rotary pump pumping the fluid entering the pump through inlet port 101 outwardly through the outlet ports 102 and 103. The pump shown in FIG. 7 is illustrated schematically and could take the form of the pump illustrated in FIG. 6. In order to have a cyclic pumping force, two radiators 78 and 104 may be utilized. The radiator 104 is constructed in the form of a plurality of vertical tubes in the same form as the radiator 78 and the radiator 104 also has a similar outlet chamber 105 with the piston 106 and piston rod 107 slideably received in the outlet chamber. The piston rod 107 is connected to the shaft 92 so that the two pistons 106 and 84 move as a unit with the shaft 92. A second lever arm 108 having one end connected adjacent the end of the piston rod 107 is also pivoted about the pivot point 95 and has an opposite end connected to the gear rack 96. The two pistons 106 and 94 contained in outlet chambers 105 and 80, respectively, have an operating cycle 180° out of phase to ensure a reciprocating pumping force for the rotary pump 100 at all times.

Thus, it can be seen that an efficient thermal motor is provided wherein thermal cycling of a spiraled tubular member converts thermal energy into mechanical motion which is then input to a piston or rotary pump for pumping fluid therethrough. The thermal motor uses a heated liquid already heated by the sun prior to its use in the motor in combination with direct radiation from the sun or either means by itself. The use of a spiral tubular member as the heating element contains the heated fluid within the element to be heated and thus prevents the loss of thermal energy which would occur if the heated fluid were allowed to contact other parts of the thermal motor. Therefore, more of the thermal energy of the heated fluid is expended in expanding the tubular coil member and more mechanical motion is produced thereby. Such a motor may use a heated fluid and a cooling fluid fed by gravity flow. Where this is not available, the motor can power two pumps each of a size commensurate with the total power available, one of which is pumping the driving fluids, while the other provides the net output, such making the thermal motor self-sufficient. An auxiliary motor or wind-power can also be used. In one practical application, the thermal motor is used for driving an irrigation pump wherein the requirement for the head developed is only a few feet and wherein quite considerable amounts of water can be moved.

While a preferred embodiment of the invention has been described using specific terms, such description is for illustrative purposes only, and it is to be understood that changes and variations may be made without departing from the spirit or scope of the following claims.

What is claimed is:

1. A thermal motor for converting heat energy into mechanical motion comprising:
   a. an inner core member supported on a base structure having a solid cylindrical disc plate adjacent a lower portion thereof extending radially therefrom;
   b. an inner concentric cylinder carried by said inner core member;
   c. an outer concentric cylinder rotatably carried on said disc plate defining a space between said inner and outer concentric cylinders;
   d. a spiral tubular member encircling said inner concentric cylinder and contained within said space having a first end portion connected to said inner concentric cylinder and a second end portion connected to said outer concentric cylinder;
   e. means for conveying a heated fluid through said tubular member during a heat cycle; and
   f. cooling means for cooling said tubular member during a cooling cycle;

whereby said spiral tubular member expands and contracts according to the heating and cooling of said tubular member causing said outer concentric cylinder to reciprocally rotate freely on said disc plate accordingly.

2. The apparatus of claim 1 further comprising a plurality of spoke members carried adjacent the top of said inner core member extending radially therefrom to said outer concentric cylinder for containing said spiral tubular member within said space and whereby cooling water sprayed over a top side of said motor may freely pass between said spoke members to contact said spiral tubular member at the end of a heat cycle.

3. The apparatus of claim 1 wherein said cylindrical disc plate includes a vertically extending spiral spacer member for receiving and containing said spiral tubular member reducing friction between adjacent portions of said tubular member as it expands and contracts.

4. The apparatus of claim 1 further comprising a pump housing having inlet and outlet ports, a pump member carried within said housing, connecting means for connecting said outer concentric cylinder to said pump member to reciprocate said pump member in said pump housing to pump a fluid through said pump housing.

5. The apparatus of claim 4 wherein:
   a. said pump member includes a piston rod having a piston carried on one end thereof slideably received in said pump housing;
   b. said connecting means includes a linkage arm connected to said outer concentric cylinder and to a free end of said piston rod for reciprocating said piston in said pump housing; and
   c. said inlet and outlet ports are provided with valves to control the flow of fluid through said pump housing.

6. The apparatus of claim 5 wherein a pair of said pump housings and said pump members is provided, said pair of pump members being commonly attached to said linkage arm providing a pumping cycle of fluid through each of said pump housings 180° out of phase.

7. The apparatus of claim 4 wherein:
   a. said pump member includes a reciprocating rotary vane member having a central input shaft connected thereto;
   b. said connecting means includes gear teeth carried by said outer concentric cylinder, a gear member carried by said central input shaft, and a gear drive assembly meshing with said gear member, said gear assembly being reciprocally driven by said gear teeth carried by said outer cylinder to reciprocally drive said rotary vane member; and
   c. said pump housing includes an inlet port and a pair of valved outlet ports which open and close according to the reciprocation of said rotary vane pump member.

* * * * *